(12) United States Patent
McCombe et al.

(10) Patent No.: US 11,227,362 B2
(45) Date of Patent: *Jan. 18, 2022

(54) MULTISTAGE COLLECTOR FOR OUTPUTS IN MULTIPROCESSOR SYSTEMS

(71) Applicant: Imagination Technologies Limited, Kings Langley (GB)

(72) Inventors: James Alexander McCombe, San Francisco, CA (US); Steven John Clohset, San Francisco, CA (US); Jason Rupert Redgrave, Mountain View, CA (US); Luke Tilman Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,712

(22) Filed: Sep. 4, 2020

(65) Prior Publication Data

US 2020/0402199 A1 Dec. 24, 2020

Related U.S. Application Data

(63) Continuation of application No. 16/267,161, filed on Feb. 4, 2019, now Pat. No. 10,783,605, which is a
(Continued)

(51) Int. Cl.
*G06T 1/60* (2006.01)
*G06T 15/06* (2011.01)
*G06T 1/20* (2006.01)

(52) U.S. Cl.
CPC .............. *G06T 1/60* (2013.01); *G06T 1/20* (2013.01); *G06T 15/06* (2013.01); *G06T 2210/52* (2013.01)

(58) Field of Classification Search
CPC .. G06T 1/60; G06T 15/06; G06T 1/20; G06T 2210/52
See application file for complete search history.

(56) References Cited

U.S. PATENT DOCUMENTS 5,369,418 A 11/1994 Richards
7,310,098 B2 12/2007 Ohba
(Continued)

FOREIGN PATENT DOCUMENTS

CN 1957376 A 5/2007
CN 102037497 A 4/2011
(Continued)

*Primary Examiner* — William A Beutel
(74) *Attorney, Agent, or Firm* — Potomac Law Group, PLLC; Vincent M DeLuca

(57) ABSTRACT

Aspects include a multistage collector to receive outputs from plural processing elements. Processing elements may comprise (each or collectively) a plurality of clusters, with one or more ALUs that may perform SIMD operations on a data vector and produce outputs according to the instruction stream being used to configure the ALU(s). The multistage collector includes substituent components each with at least one input queue, a memory, a packing unit, and an output queue; these components can be sized to process groups of input elements of a given size, and can have multiple input queues and a single output queue. Some components couple to receive outputs from the ALUs and others receive outputs from other components. Ultimately, the multistage collector can output groupings of input elements. Each grouping of elements (e.g., at input queues, or stored in the memories of component) can be formed based on matching of index elements.

20 Claims, 7 Drawing Sheets

Related U.S. Application Data continuation of application No. 15/446,227, filed on Mar. 1, 2017, now Pat. No. 10,242,426, which is a continuation of application No. 13/611,325, filed on Sep. 12, 2012, now Pat. No. 9,595,074.

(60) Provisional application No. 61/535,487, filed on Sep. 16, 2011.

(56) References Cited

U.S. PATENT DOCUMENTS

| | | |
|---|---|---|
| 7,447,873 B1 | 11/2008 | Nordquist |
| 7,471,291 B2 | 12/2008 | Kaufman et al. |
| 8,072,460 B2 | 12/2011 | Lauterbach et al. |
| 8,773,422 B1 | 7/2014 | Garland et al. |
| 2004/0066384 A1 | 4/2004 | Ohba et al. |
| 2006/0055695 A1 | 3/2006 | Abdalla et al. |
| 2007/0050603 A1 | 3/2007 | Vorbach et al. |
| 2009/0322752 A1 | 12/2009 | Peterson et al. |
| 2010/0042808 A1 | 2/2010 | Moyer |
| 2011/0050698 A1 | 3/2011 | Peterson et al. |
| 2012/0096475 A1 | 4/2012 | Johnson et al. |
| 2012/0139926 A1* | 6/2012 | Clohset ................ G06F 40/169 345/502 |
| 2012/0200580 A1 | 8/2012 | Gnanasambandam et al. |
| 2013/0033507 A1 | 2/2013 | Garanzha et al. |

FOREIGN PATENT DOCUMENTS

| | | |
|---|---|---|
| EP | 1 535 190 | 6/2005 |
| WO | 2004/015568 A3 | 2/2004 |
| WO | 2004015568 A2 | 2/2004 |
| WO | 2005101322 A1 | 10/2005 |

\* cited by examiner

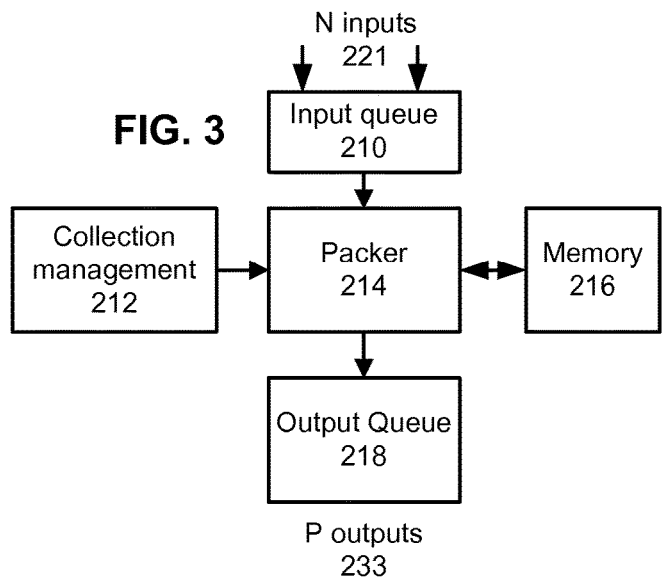
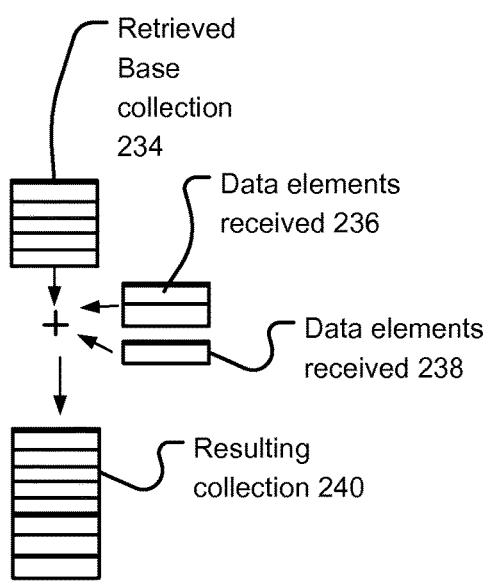
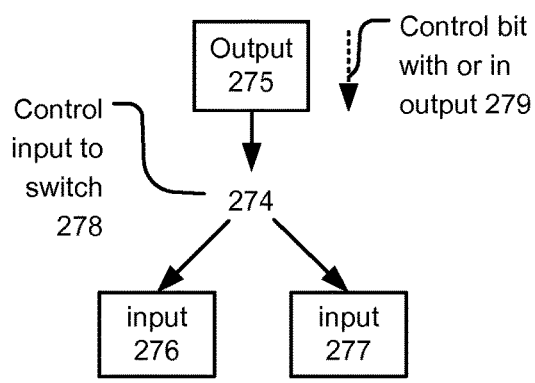
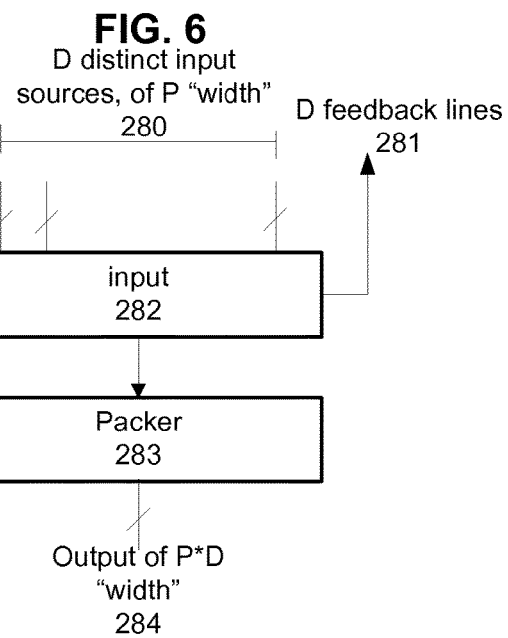

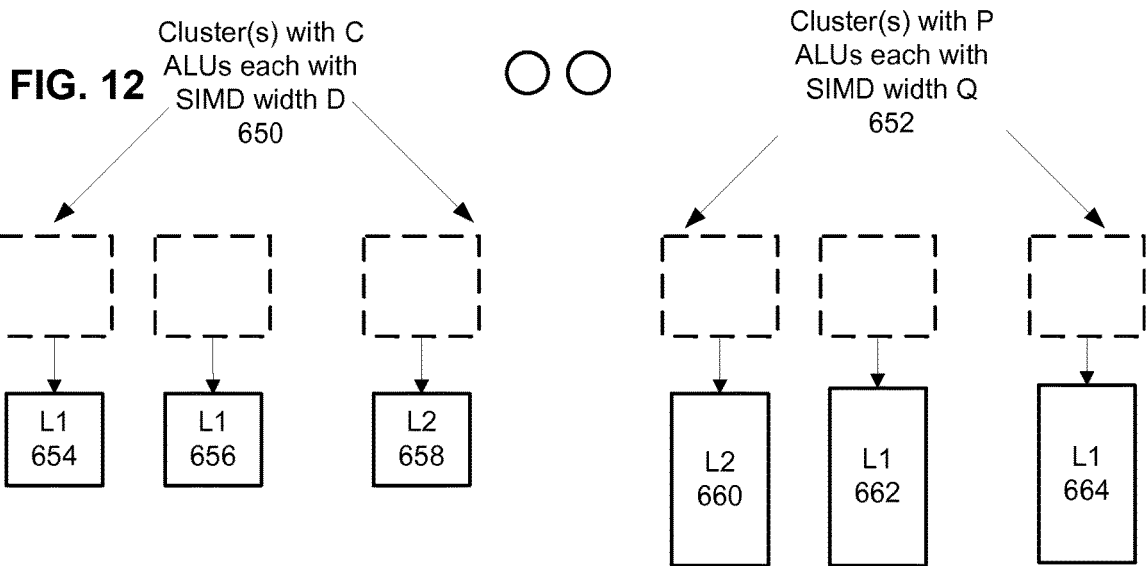
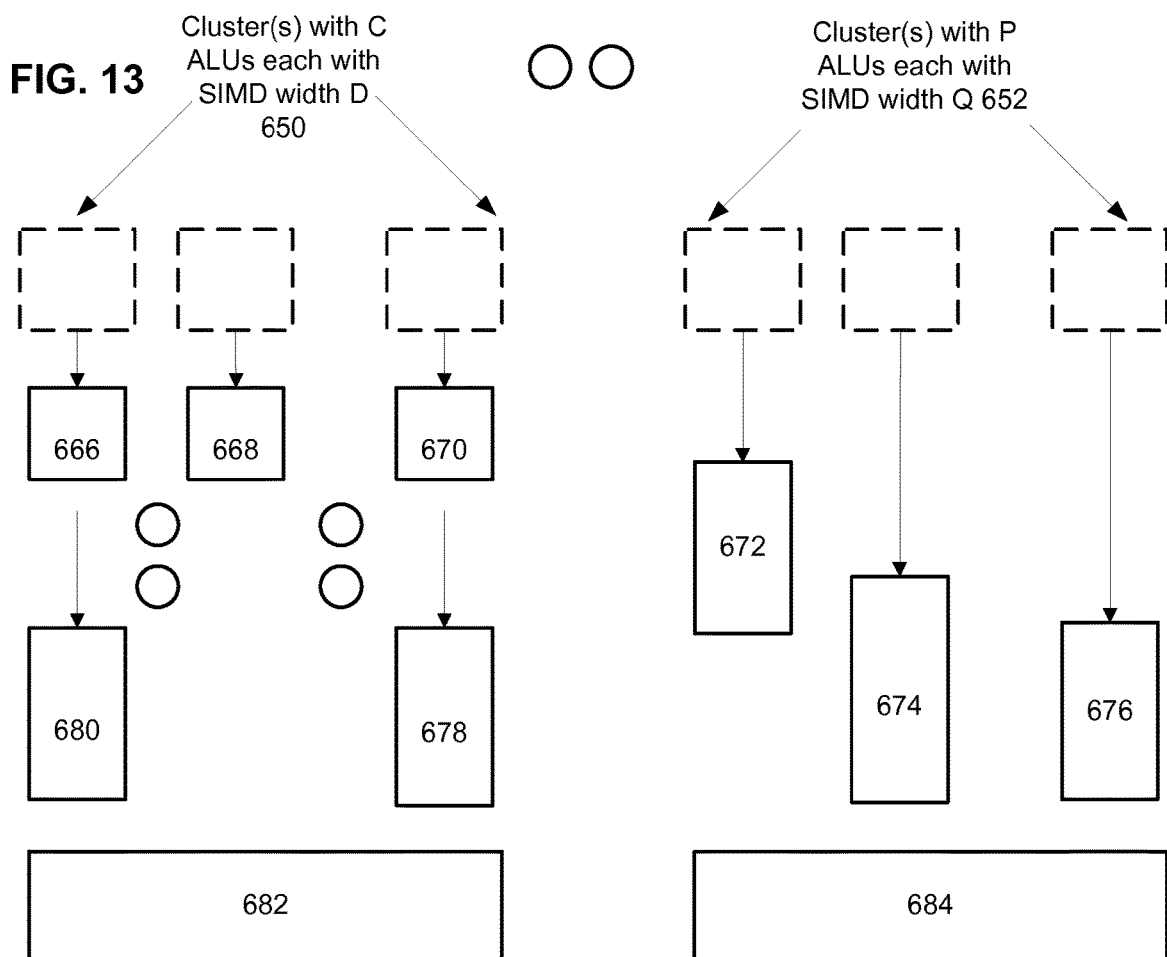

MULTISTAGE COLLECTOR FOR OUTPUTS IN MULTIPROCESSOR SYSTEMS

CROSS REFERENCE TO RELATED APPLICATIONS

This application is a continuation under 35 U.S.C. 120 of application Ser. No. 16/267,161 filed Feb. 4, 2019, which is a continuation of prior application Ser. No. 15/446,227 filed Mar. 1, 2017, now U.S. Pat. No. 10,242,426, which is a continuation of prior application Ser. No. 13/611,325 filed Sep. 12, 2012, now U.S. Pat. No. 9,595,074, which claims priority under 35 U.S.C. 119 from U.S. Prov. Pat. App. No. 61/535,487, filed on Sep. 16, 2011, entitled "Multistage Collector for Outputs in Multiprocessor Systems", which is incorporated by reference in its entirety herein for all purposes.

BACKGROUND

Field

Rendering photo-realistic 2-D images from 3-D scene descriptions with ray tracing is well-known in the computer graphics arts. Ray tracing is known to produce photo-realistic images, including realistic shadow and lighting effects, because ray tracing can model the physical behavior of light interacting with elements of a scene. Ray tracing usually involves obtaining a scene description composed of geometric shapes, which describe surfaces of structures in the scene, and can be called primitives. A common primitive shape is a triangle. Objects can be composed of one or more such primitives. Objects can be composed of many thousands, or even millions of such primitives. Scenes typically contain many objects. Resolution of displays and the media to be displayed thereon continue to increase. Ray tracing requires repeating a few calculations many times with different data (e.g. intersection testing), as well as executing special purpose code ("shading") for identified ray intersections.

Ray tracing calculations can be parallelized relatively easily at the level of pixels of a frame being rendered, because a great many of these calculations are independent of each other, or have well-characterized dependencies. However, other portions of the calculation are not so easily parallelized. More broadly, ray tracing is an example work load among a variety of workloads that can benefit from practical increases in processing throughput. As such, provision of different computing architectures and components thereof continues to be an active area research and development in furtherance of such goals.

BRIEF DESCRIPTION OF THE DRAWINGS

FIG. 3 depicts an example block diagram for a collector element (a "collector") that can be employed architectures according to FIGS. 1-2;

FIG. 4 depicts an example operation of a collector;

FIG. 5 depicts an example where a switch can couple one output with a selected input, and which can switch among multiple collectors in some examples herein;

FIG. 6 depicts an example where a collector can have a many to one input to output ratio, where in the inputs can essentially be hardwired, and the input can generate stall conditions to arbitrate writes to the input;

FIGS. 12 and 13 depict still further examples of collectors and their potential interrelation to each other.

SUMMARY

Figure 1:
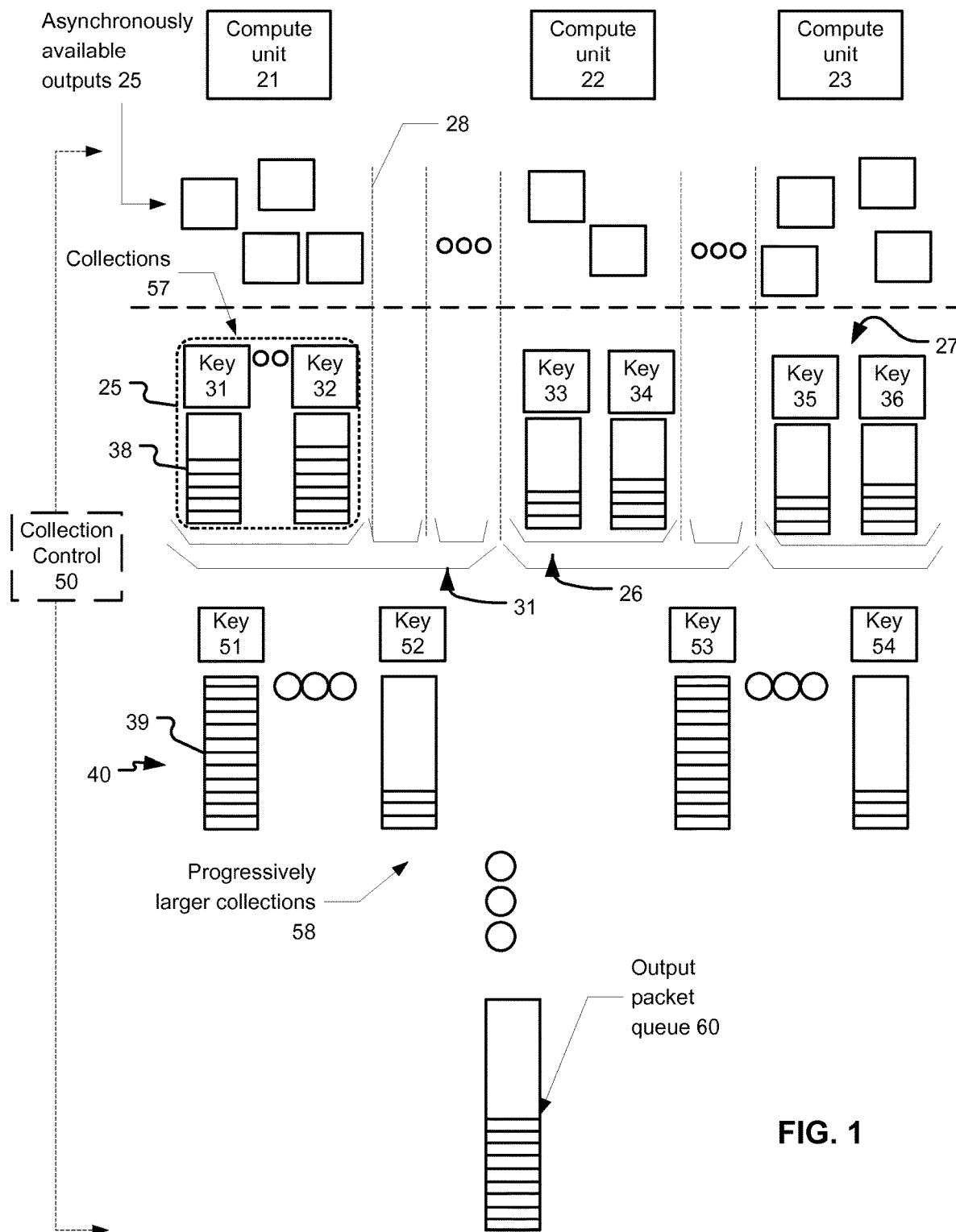
FIG. 1 depicts a schematic view of a multistage output collector that couples with a plurality of compute units.

Aspects include a multistage collector to receive outputs from plural processing elements. Processing elements may comprise (each or collectively) a plurality of clusters, with one or more ALUs that may perform SIMD operations on a data vector and produce outputs according to the instruction stream being used to configure the ALU(s). The multistage collector includes substituent components each with at least one input queue, a memory, a packing unit, and an output queue; these components can be sized to process groups of input elements of a given size, and can have multiple input queues and a single output queue. Some components couple to receive outputs from the ALUs and others receive outputs from other components. Ultimately, the multistage collector can output groupings of input elements. Each grouping of elements (e.g., at input queues, or stored in the memories of component) can be formed based on matching of index elements.

In some aspects, examples of systems, components and methods that address feeding of a parallel computing architecture with inputs, during computation in which the inputs depend on outputs of previous computation. In some aspects, the parallel computing architecture can include one or more compute units, each of which includes one or more SIMD processing units. Within a SIMD processing unit, a vector of data elements is processed in parallel. Between SIMD units and between compute units, a control thread can be different. In some aspects, an operation (e.g., instruction) executed at any given time within a particular SIMD unit can be selected from among a plurality of candidate threads of control. Changes in control threads can occur on a clock-by-clock basis in some implementations. In some aspects, data elements processed by a particular SIMD unit can be fetched as a group, with other data elements processed by other SIMD units. In some examples, a number of SIMD units may be loaded with a particular thread of control, and be at different stages of execution (e.g., repetitive execution with a number of data elements being provided to it), such that results of computation from the compute units may be available as time progresses, and aspects disclosed allow for collection and formation of further groupings (or identifications of groupings) of data elements that can be used during further computation in the compute elements.

In an aspect, a machine-implemented method of distributed multi-processing, comprises asynchronously receiving packets from a plurality of outputs of computation units. Each of the packets comprises one or more constituent elements associated with a respective index element describing computation tasks to be performed for the one or more constituent elements. The method provides, in a plurality of steps, packaging the constituent elements comprised in the received packets into progressively larger packets. The packaging comprises, in each of the steps, grouping constituent elements into packets by comparing respective index elements in multiple received packets, and grouping those constituent elements associated with matching index fields.

In some aspects, the packaging comprises buffering constituent elements of a packet received at a first time and combining the buffered constituent elements with constituent elements from a packet received at a second time having an index element matching the index element of the packet received at the first time.

In some aspects, the plurality of steps are performed by collector units arranged in an interconnected series and each of the collector units is operable to identify collections to evict from its memory, responsive to a collection eviction process. In some aspects, the series of collector units is arranged in an inverted hierarchy, beginning with a layer of collector units receiving smaller packets and terminating with one or more collectors outputting one or more larger packets, each containing constituent data elements of a plurality of the smaller packets.

The method of distributed multi-processing may further comprise applying backpressure between collector units in different layers of the inverted hierarchy to regulate progress of packets through the plurality of collectors. The method may further comprise selecting each description of a computation task from a plurality of pre-defined types of computation tasks comprising testing a ray for intersection with one or more shapes identified by the constituent elements. One or more of the descriptions of a computation task to be performed may comprise information identifying a shape, and the constituent elements comprise identifiers for rays to be tested for intersection with the shape. Each description of computation to be performed comprises a reference to a memory location. Each description of computation to be performed may comprise a reference to a memory location, in a region of a memory reserved for storing a defined kind of shape data used during graphical rendering of a scene defined using the shape data. In some aspects, the defined kind of shape data is selected from acceleration shape data and primitive shape data.

In an aspect, a computing system comprises a plurality of computation clusters, each for outputting discretized results of performing computation tasks. Each discretized result comprises a collection index describing a respective computation task to be performed and a data element for use during performance of the computation task described by the collection index. The computing system also comprises a plurality of collectors, some of the collectors are coupled to receive the discretized output outputted from respective computation clusters of the plurality. The collectors interoperate to gather the data elements from multiple discretized outputs into progressively larger collections. Each collector comprises an index matcher that matches two or more collection indexes to identify common collection indexes, and a grouper configured to group data elements related to the same collection index for output as a group in conjunction with that collection index.

In the computer system, the collectors of the plurality are operable to activate a stall line that prohibits one or more collectors from outputting a collection of discretized outputs. The collectors of the plurality are operable to compact information from the discretized outputs by collecting non-redundant information from multiple discretized outputs, and to output a compacted collection of information on an output that is conditioned based on monitoring the stall line.

Each computation cluster may comprise a SIMD ALU, a port for reading to and writing from a memory subsystem, and an output port. Each collector may ingest discretized results of up to a first size and produces outputs fewer in number and larger than the first size. In some aspects, the plurality of collectors can be arranged in an inverted hierarchy, and comprise a first layer of collectors. Each collector is coupled to a respective output port from a computation cluster of the plurality, and comprises a memory and a packing unit operable to receive discretized outputs from the coupled output port and to collect each discrete output into a collection according to an index associated with the discretized output. The plurality also has one or more subsequent layers of collectors, each coupled to receive increasingly larger collections of the discrete outputs. Each of the collectors is operable to identify collections to evict from its memory, responsive to a collection eviction process.

The system also may comprise a distributor coupled to a final collector of the inverted hierarchy, and operable to distribute data elements from received groups of data elements among the plurality of computation clusters according to which of the computation clusters is to execute further computation involving each data element. The collection eviction process comprises each collector unit independently evicting collections in its memory that are full. Each discrete output may comprise a results vector, with a number of results up to a SIMD vector width of the computation cluster outputting that discrete output.

In a further aspect, a method of parallelized computation in a distributed multiprocessor system comprises executing a plurality of programs to determine respective pairings of data elements and code modules to be executed subsequently in the multiprocessor system and outputting the pairings from a plurality of ports. The method comprises collecting the data elements of the pairings that reference the same code module by extracting each of the data elements from its original pairing and grouping the extracted data elements referencing the same code module into larger groupings. Each grouping maintains an association with its respective code module. The method includes terminating the collecting of data elements for a specific grouping based on a heuristic and submitting to the distributed multiprocessor system. The specific grouping of data elements can be used during execution of the code module associated with that specific grouping of data elements. Such a method also can comprise including an instruction pointer identifying a start of instructions to be executed for the data elements of that grouping.

A further aspect is a component for use with a multiprocessor computation system comprising a plurality of computation units. The component comprises a plurality of buffering units, each comprising a memory, at least one input port, an output port, and a controller for monitoring the input port for arrival of data, that are coupled to receive, as inputs, outputs from different of the computation units. The component further comprises interconnect coupling some of the buffering units to respective inputs of different computation units, and coupling some of the buffering units to different of the buffering units. The plurality of buffering units and the interconnection provide multiple points of deferral between outputs from the computation units and inputs to the computation units, each of the points of decoupling operable to aggregate a number of discrete inputs into fewer discrete outputs.

DETAILED DESCRIPTION

As semiconductors continue to scale to lower geometries, theoretical clock speeds and transistor counts continue to increase. It has been recognized however, that attempting to use an entire transistor budget for a single processor core, such as a fine-grained pipeline processor, with ability to execute instructions out of order, is not going to be able to stay within a reasonable power budget, and presents a variety of other challenges in design, and fabrication. Thus, computing architectures have sought to increase computing power by increasing parallelism. A variety of approaches to parallel computing exist, with examples including Single Instruction Multiple Data (SIMD) and Multiple Instruction Multiple Data (MIMD) computers, and combinations thereof.

One area that remains a topic of consideration is how to subdivide a given computing task to take advantage of a parallelized computation resource. In some aspects, the following relates to methods, components and systems of computation that allow finer grained sub-division of computation tasks, which can allow more efficient performance of such computation tasks, such as by improving a capability of scheduling finer grained tasks, and allowing wider computation architectures to remain saturated. However, finer grained parallelism can pose a data management problem, in that many more discrete portions of data may need to be managed efficiently. Thus, in some aspects, these disclosures provide examples that can be used in such data management for finer grained parallelism.

Single Instruction Multiple Data (SIMD) computing provides an approach to increase computational parallelism within a processor, without duplicating the entirety of a processor. For example, a plurality of ALUs can share a single instruction decoder and scheduler, an instruction cache, and memory interface. Multiple Instruction Multiple Data (MIMD) provides an approach where essentially multiple redundant cores can be placed on a single die. MIMD computers can have SIMD components. Regardless of how a given transistor budget or a given computer architecture is organized, computation components will ultimately need to complete tasks and schedule new tasks. Other considerations include an amount of interconnect required to implement a given design, as well as an amount of global synchronization required.

The following disclosure presents examples of components, methods, and systems that provide practical approaches to enabling larger scale, finer grained parallelism of computation tasks. In some implementations, finer grained parallelism is achieved by segmenting programmatic workloads into smaller discretized portions, where each portion can be specified by a minimum of two elements. A first element, in some implementations can be indicative both of a configuration or program to be executed, and a first data set to be used in such execution, the other element can be indicative of a second data element to be used in such computation. In the context of ray tracing, one data element can be indicative of a shape to be tested for intersection with a ray. Further, by specifying the shape, a program to be run can be implicitly identified. For example, a bounding volume would require an intersection test program for the kind of bounding volume used.

In some implementations, the disclosed structures and methods provide for multiple compute units to execute one or more threads of control, where each thread of control can produce one or more outputs. In some cases, each thread of control can be operating on a vector of data comprising a plurality of elements. In some situations, threads of control may complete for some data elements of a vector and not others, and makes results available at an output from the compute units. A multistage collector can collect these results into collections which can ultimately be used as, locate, or produce, inputs to the compute units (e.g., new vectors of data elements). Across compute units, it is desirable also to allow compute units to be able to produce or output results of computation asynchronously from the other compute units (e.g., that components described below may be asynchronous the compute units, that the compute units do not need to be executing the same instruction in a single thread of control, that different compute units can be operating within a window of data, so that different compute units may be processing different data elements with the same program of control, or that the compute units can be operating with different threads of control). Different implementations may have different degrees or characteristics of asynchronous behavior, and the collecting architecture examples and implementations described provide scalable approaches to increased data parallelism.

FIG. 1 depicts a schematical system architecture 10 which comprises a plurality of compute units (units 21, 22 and 23 are identified, by example). Each compute unit 21-23 can produce respective outputs 25 asynchronously from the other compute units. Such outputs can be produced by the compute units during program execution. Examples of certain kinds of outputs are described in further detail below.

The asynchronous outputs 25 from each of the compute units are collected by a respective collector 25, 26, 27 (depiction of a corresponding collector for each compute unit is by way of example and not limitation, as a collector could serve multiple compute units, or multiple distinct collectors could serve one distinct compute unit). One way to consider the coupling between compute units and collector units is that each collector unit would couple to receive outputs from at least one compute unit. The outputs can be made available on a point-to-point connection between collector and compute, for example. For simplicity, these disclosures will assume a 1:1 correspondence between collectors and compute units.

Each instance of output from a compute unit can be collected separately by a collector receiving such output instance. As such, each collector 25, 26 and 27 can operate by receiving outputs as they are made available from a respectively coupled compute unit. In one particular example, each output instance includes an index element, and one or more associated data elements. The grouping of the index element and the one or more associated data elements is referred to as a packet herein for convenience. A packet thus comprises a combination of an index element and one or more data elements associated with that index element.

As will be described in more detail below, one task conducted by each collector is to monitor for new packets on its one or more inputs, and upon there being a new input, to extract the index element, identify whether that index element exists in a buffer controlled by that collector, and if so, append the data elements from the packet to data elements stored in the buffer and associated with that index element.

By way of example, collector 25 is shown to includes a plurality of existing collections, wherein two collections respectively associated with a key 31 and a key 32 are maintained, similarly collector 26 maintains collections associated with keys 33 and 34, and collector 27 maintains collections associated with key 35 and with key 36. The dashed lines running vertically, such as line 28, indicate that other compute units may exist and collectors may respectively be provided for each. As will be described, the interoperation and data exchange among the collectors operates to make progressively larger collections of data elements, where each collection is associated with a particular index element.

In an example, each collector can operate on a quantum of data of a given size, or up to a maximum size. For example each collector 25-27 may be operable to accept data from compute units that comprises a vector of data up to a width of a SIMD vector within such compute units. In one example, such outputs may comprise only one pairing of an index element and an associated data vector, and in other examples such outputs may comprise a plurality of pairings between index elements and associated data vectors.

Generally, each collector will be operable also to perform a task of identifying index elements and associated groupings of data elements to be outputted to a downstream collector. Each collector can perform this task by following a set of heuristics, such as tracking a number of data elements in each collection, monitoring buffer fullness, and receiving indicators from upstream and downstream collectors. After a stored association between an index element and data elements is evicted from a buffer, it is referred to as a packet, for sake of convenience, even though it may contain largely the same data. As will be described below, collectors can be interconnected with queues, or they can have very little or no temporary storage that modulates communication between collectors. For example, between collectors, a queue can store a single packet, or a few packets in some implementations.

Returning to FIG. 1, FIG. 1 depicts that the architecture 10 includes further layers of collectors, each collecting outputs from one or more upstream collectors. A packet size on which each collector operates may grow larger further downstream. For example, collector 25 may collect up to 16 data elements in a particular collection associated with key 31, which can arrive in 16 discrete outputs from compute unit 21 that are interleaved in time with other outputs from compute unit 21. Responsive to detecting such number of data elements in the collection associated with key 31, collector 25 may output data representative of key 31 and those 16 data elements.

By reference to FIG. 1, such architecture features can be explained by reference to packet element 38 in the collection associated with key 31, and by comparison with packet element 39 in the collection associated with key 51. In particular, packet element 38 and packet element 39 may each represent one discrete input to the collector in which each resides, and be of a different size or represent different numbers of data elements.

In the example architecture of FIG. 1, each compute unit couples with a respective collector, and these collectors, through one or more intermediate collectors, funnel outputs from the compute units into progressively larger collections 58, ultimately terminating at an output packet queue 60. Output packet queue 60 would thus contain discrete outputs from all the compute units in the system assembled into packets according to a respective index elements originally provided in those discrete outputs.

The collectors may each operate independently to determine when collections should be evicted from respective local buffers, in response to a variety of inputs which can include determining fullness of particular collections, back pressure information from downstream collectors and other tuning parameters that may be provided. In other implementations a controller 50 may be provided to indicate to collectors when each collector should evict a collection. Controller 50, depending on implementation may also indicate to particular collectors a preferred index elements for which a collection should be evicted for example.

Each collector may be clocked by a respective clock signal. In some implementations, all the collectors may be clocked from a single reference clock, while in other implementations, a reference clock can be adjusted for providing an input to different of the collectors. For example, collectors closer to compute units may be clocked at a higher frequency than collectors further downstream. Inputs that function as multiple virtually distinct input ports can be implemented as a multiplexed data transfer on fewer physical connection elements, and can include, for example, time division multiplexing of distinct outputs from different computation units for reception by the same input port of a collector.

Figure 2:
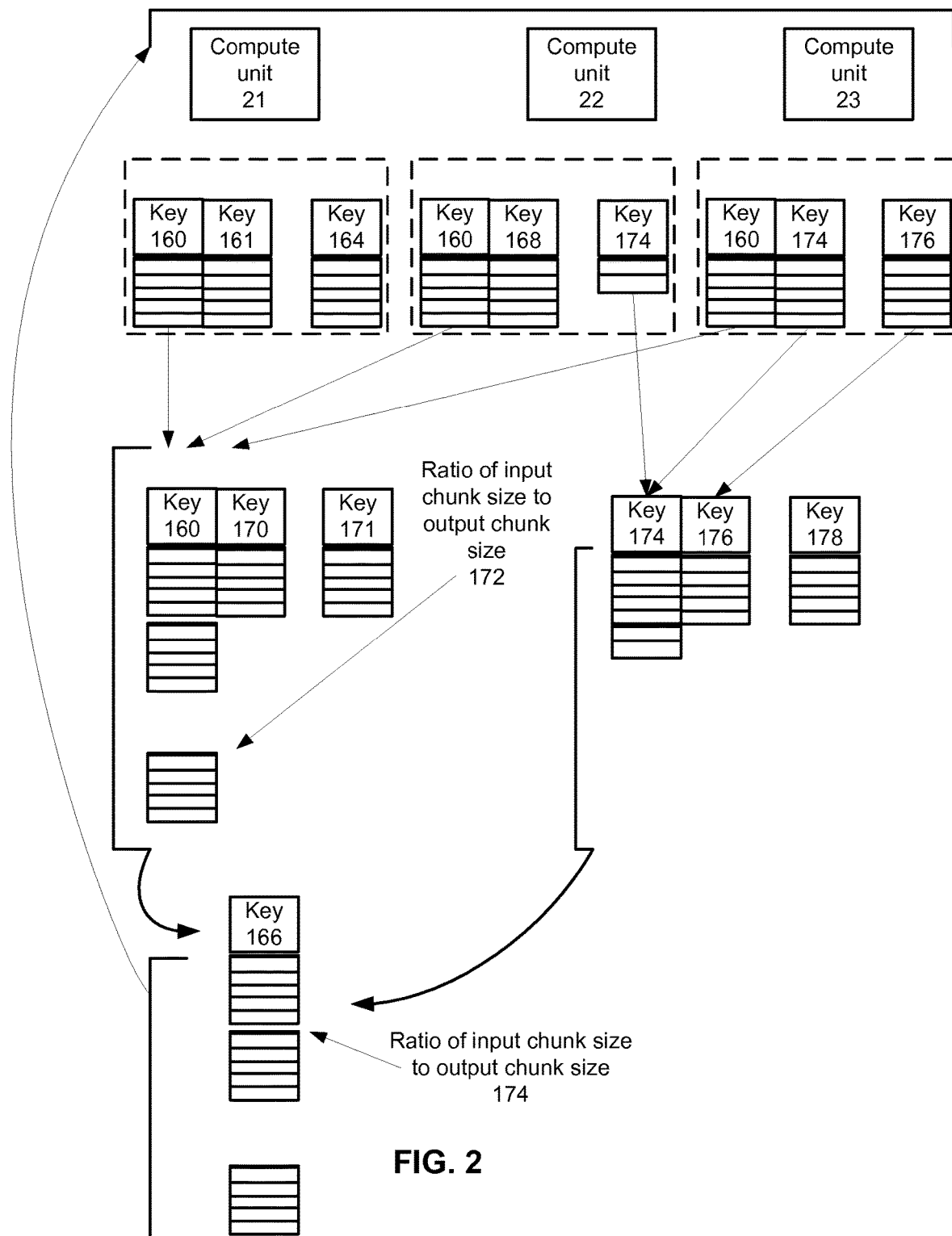
FIG. 2 depicts further aspects of multistage output collection according to these disclosures.

FIG. 2 depicts further aspects of the collector architecture introduced in FIG. 1. In FIG. 2, compute units 21-23 feed outputs to collectors identified by dashed boxes, each having collections of data elements associated with a respective index element. A given index element can exist simultaneously in multiple collectors, as exemplified by key 160. FIG. 2 depicts that the collectors receiving outputs from the compute units in turn produce outputs that are collected in a downstream collector. For example, the separate data elements associated with key 160 in multiple collectors are concatenated in a collection.

FIG. 2 also depicts that a given output chunk size can be a multiple of an input chunk size. However, there is no requirement that even though a collector may be able to handle a given input or output chunk size, that inputs and outputs must be of such size. FIG. 2 depicts that a packet comprising a given index element and associated collected data elements can be fed back to compute units 21-23. In one example, the index element can be used as a basis for identifying a program to execute, and the data elements can comprise references to data (or data values) that are to be used in executing such program in the compute units. A program can be any sequence of instructions or other configuration information useful to control compute units 21-23.

FIG. 3 depicts an example construction of a collector as in FIGS. 1 and 2. The example collector comprises an input queue 210, a packer 214 which interfaces with a memory 216, an output queue 218 and collection management logic 212. Input queue 210 couples with an output of one or more compute units or with an output of one or more output queues of other collectors. Presence of data to be processed in input queue 210 triggers retrieval of such data by packer 214 which identifies an index element in such data and matches such index elements to potential collections associated with that index element in memory 216. The example construction of FIG. 3 thus is an example where some buffering between collectors is provided. Such buffering may be implemented as queues, or as FIFO queues, for example.

FIG. 4 depicts example operation of a collector, as in FIGS. 1-3, in which a base collection 234 is retrieved from memory of the collector, and combined by packer 214 with received data elements 236 and 238 that were received through one or more input queues or input transactions. In the context of the disclosure, FIG. 4 depicts a situation in which an index element provided with each of elements 236 and 238 was found to match a key associated with retrieved base collection 234. Packer 214 outputs a resulting collection 240, which can be stored again in memory 216. A number of data elements comprised in a particular group of received data elements can vary. For example, received data elements 236 are shown to comprise two data elements, while data elements 238 are shown to comprise one set of data elements. Retrieved base collection 234, and received data elements 236 and 238 are combined to produce resulting collection 240, which is stored in memory 216.

FIG. 5 depicts an architectural implementation choice in which a given collector output 275 can be split by a switch 274 between inputs 276 and 277 of two different downstream collectors (not completely depicted). Such switch can be controlled by central control logic 50, control bit(s) 279 also can be passed with output 275 in order to allow control of such switch. Such switch elements can be used to direct packets with certain index elements towards certain collectors. Such switch elements also can be used to save on wiring runs, such as by providing some amount of multiplexing on data paths connecting different collectors.

FIG. 6 depicts that collectors can be implemented with relatively little complexity. In an example implementation, an input may comprise a register to accept a P-width bit vector from any one of D distinct wired inputs. A set of feedback lines 281 can be outputted from input 282, which can indicate that input 282 currently is busy. For example, an upstream collector can check the feedback line, and if the feedback line is not asserted (can be clock edge checked), then it can assert a transaction in progress line (which could be implemented using the feedback line, with appropriate driver circuitry). That collector can then output its P-width data vector to input 282. Packer 283 then ingests such data. Packer 283 can, for example, generate P*D width outputs, for a downstream collector. In some implementations, such P*D output can be sent on fewer physical lines by sending portions of the data on multiple clock transitions, if desired. However, such approaches may increase the complexity of circuitry required, the care taken to design and tune the circuitry, and/or decrease its robustness.

Figure 7:
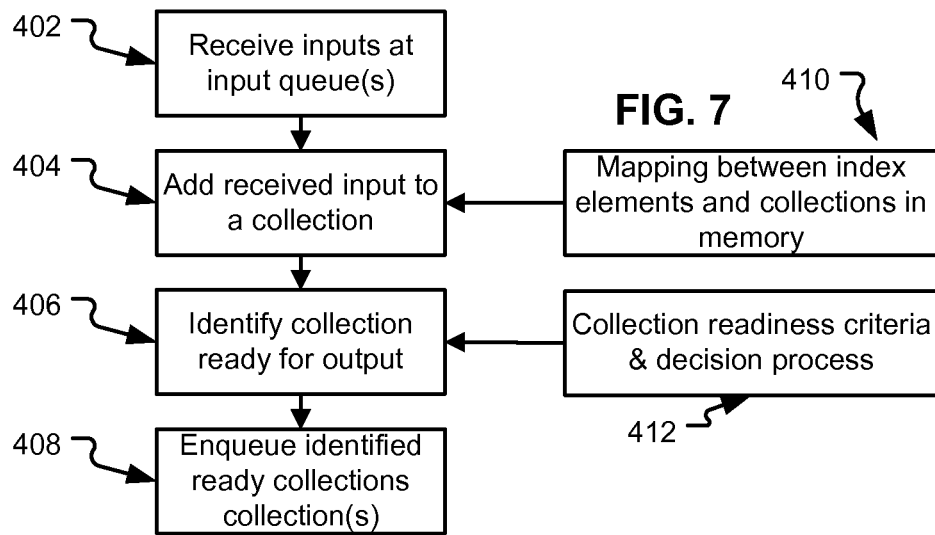
FIG. 7 depicts an example process flow that can be conducted by a collector.

FIG. 7 depicts an example process that can be implemented by collectors according to these disclosures. The depicted process includes receiving inputs at the input queue or queues (402), mapping index elements identified from such input and keys associated with collections in memory (410). An identified collection capable of receiving the data elements from input queue is thus identified and the received data elements are added (404) to that collection. Since the added and already stored data elements share in common index elements index element does not need to be separately stored again in buffer memory. Additionally each collector can identify (406) collections from its memory ready to be outputted to output queue 218. Input to such identification may include collection fullness information and results of decisions and other heuristic information (412), as described below. Identified collections can be enqueued in output queue 218.

Figure 8:
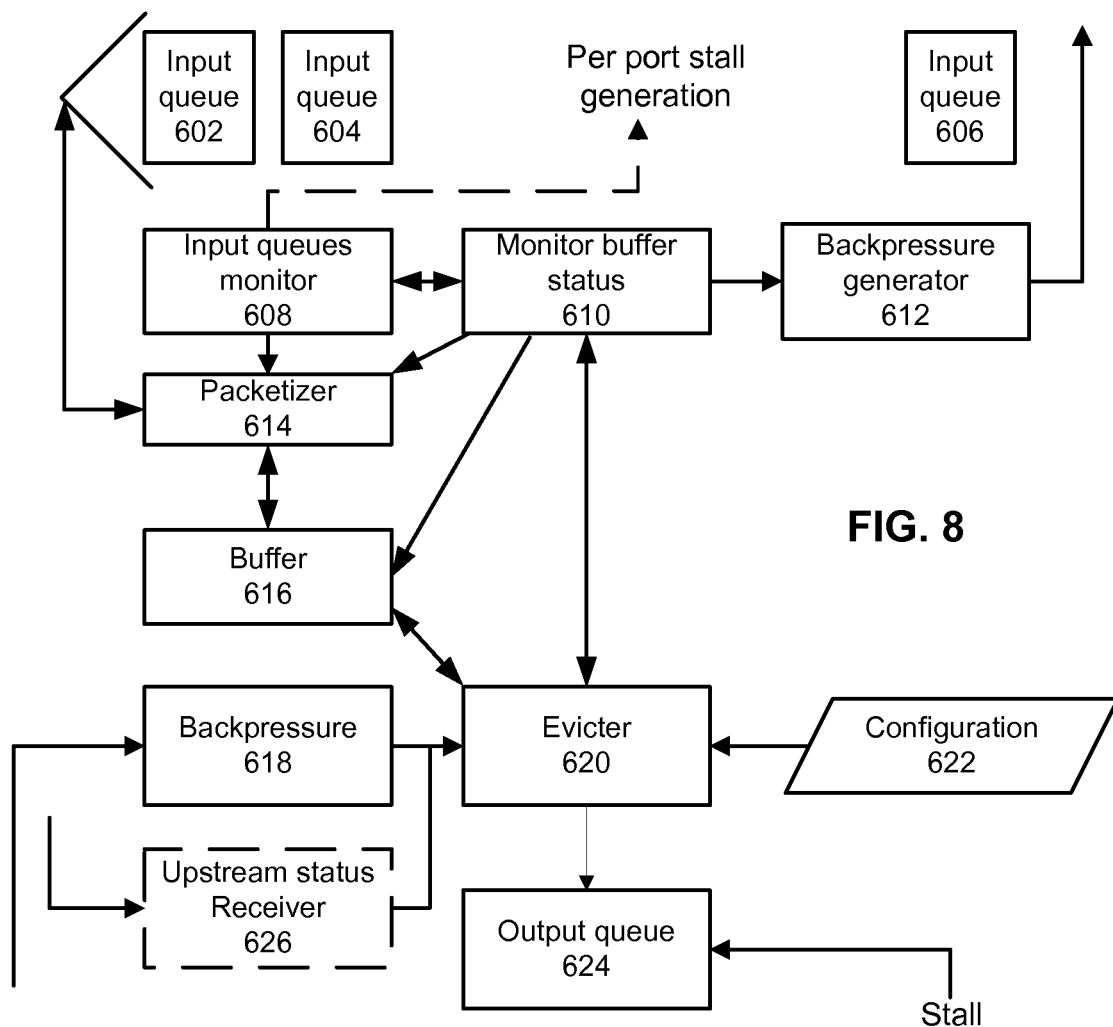
FIG. 8 depicts an another exemplary view of collectors according to this disclosure.

FIG. 8 depicts an example block diagram of a collector according to this disclosure. As discussed, the collector can have a plurality of input ports or queues 602, 604, 606, and can generate stall signals that can be specific for a particular queue, or can apply to all ports (e.g., if the ports all share an input buffer that can only be receiving a single set of inputs in any given period of time, then a stall signal can be common (e.g., can be shared) among all feeders to that input buffer). Status of the input queues/ports can be monitored by a monitor 605 which can communicate with a packetizer 614, which in turn maintains data stored in a buffer 616. A monitor for status of buffer 616 also can be provided, and which can generate statistics or other information concerning current status of data storage in the buffer. Buffer status monitor 610 can communicate such information to a backpressure generator 612 that can provide signaling information to collectors that feed the given collector's input ports 602, 604, 606. Such backpressure can provide a damping function that controls a rate of production of inputs to the collector over a period of time. In turn, collector 601 also can receive backpressure from a downstream collector to which it can output information through an output queue 624. Output queue 624 also can receive a stall input from such downstream collector(s). An evicter 620 determines which collections stored in buffer 616 are to be evicted (if any). Evicter 620 can use configuration information 622 in determining such evictions.

An upstream status receiver 626 also can be provided, which can be used in determining whether eviction policies of evicter 620 should be changed. For example, in some implementations, information concerning a trend in an amount of outputs being generated upstream may allow modification of a rate of eviction. Regarding ray tracing, such upstream information may comprise, for example, information concerning progress of ray intersection testing can allow determination whether collections with fewer members should be evicted or not. Other configuration 622 information may include biasing collectors closer to computation units to evict collections more rapidly than collectors farther from computation units, for example. Other heuristics can include biasing eviction policies either for or against collections having certain ranges of values for their indexes. For example, in one implementation, an index correlates to a kind of shape being used in a ray tracing rendering process. In some cases, computation involving certain kinds of shapes may desirably be accelerated. For example, in some cases, it may be desirable to accelerate completion of traversing rays through certain portions of an acceleration hierarchy. This can be accomplished by identifying a range of keys that correlate to such portions of the hierarchy and change eviction policies accordingly. Such configuration information can be read from or provided by a central source.

Figure 9:
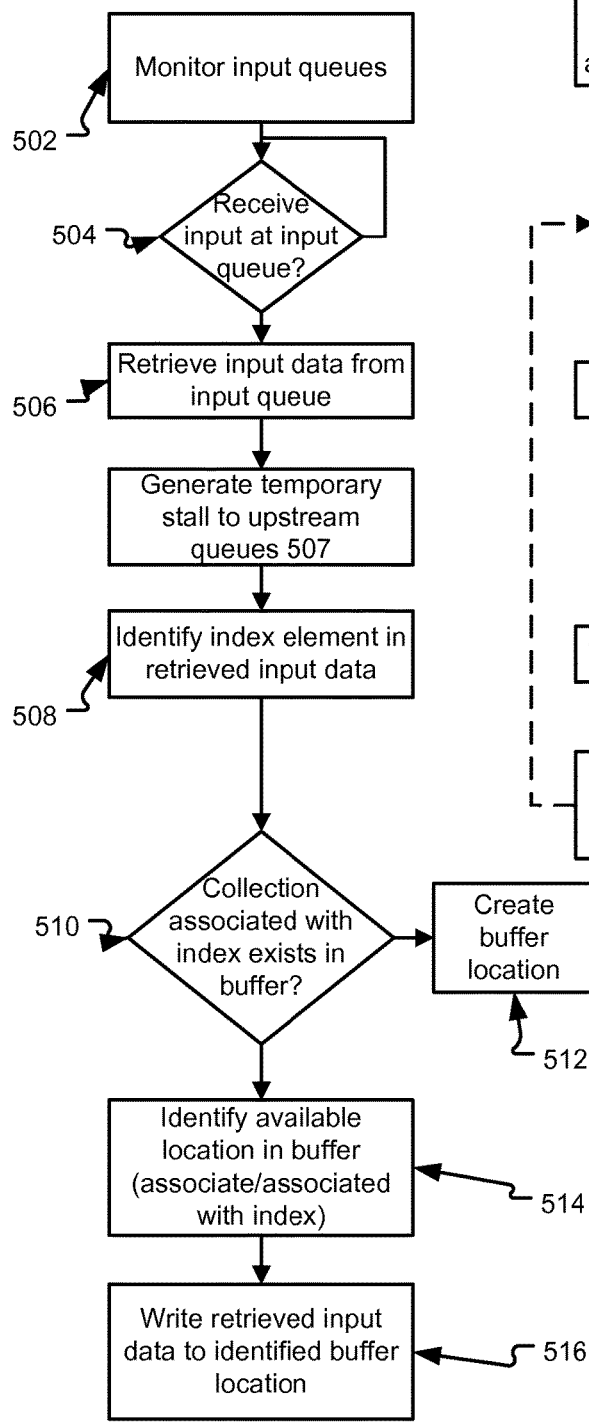
FIGS. 9 and 10 depict further example processes that can be performed by collectors in implementations of the disclosure.
Figure 10:
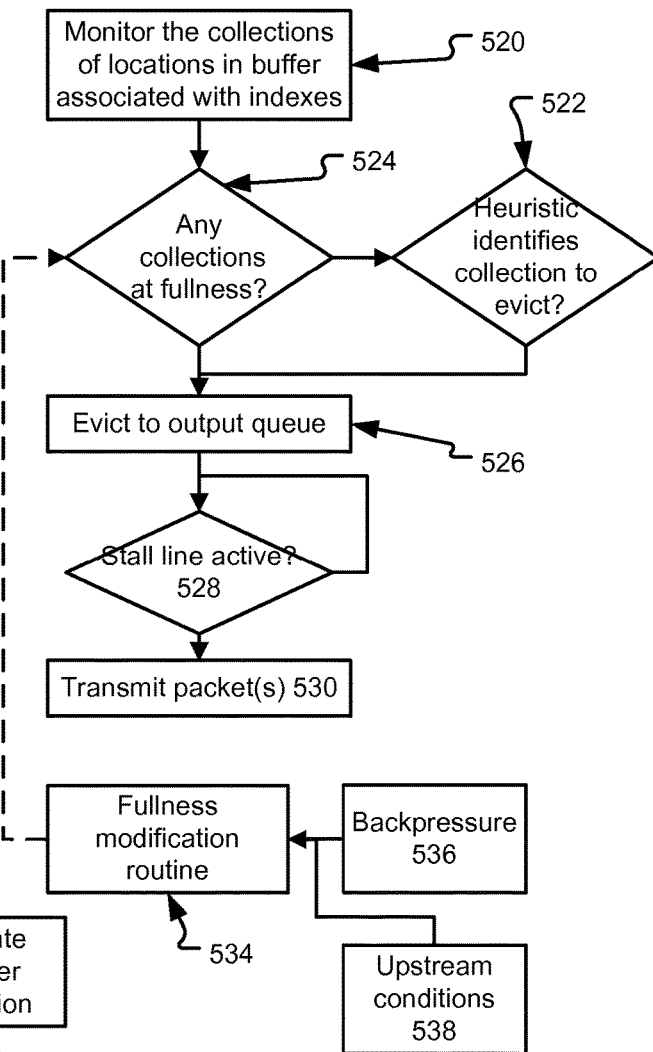

FIG. 9 and FIG. 10 depict an example where multiple concurrent processes can be performed in order to maintain distributed buffer memories in a flow of collectors. FIG. 9 depicts that a collector can monitor input queues and responsive to receiving (504) an input at a queue, can retrieve (506) the input data. During such retrieval, the collector can generate (507) a stall condition or another signal that indicates to upstream collectors that this collector is busy. This approach can be employed when each collector serially ingests inputs, and does not have buffer capacity to temporarily store multiple inputs awaiting ingestion. Even where an input buffer is provided, a stall signal may be provided where the buffer is nearing or at capacity. An index element in the received input is identified (508) and a determination whether that index element matches any existing key for a buffered collection is made. If there is no collection existing, then a collection/buffer location can be created (512). If there is, then a spot within such existing collection is identified (514) and the data elements associated with the index element are appended to the collection.

This process is explained in view of the concurrent process of FIG. 9, which involves identifying collections to be evicted from the buffer, in order to maintain space for new collections to be created. A possibility that the create (512) step may trigger an eviction can be subsumed in the general eviction management process, wherein lack of free buffer space can be a trigger to an eviction process that can have a number of inputs.

FIG. 9 depicts that collections can be monitored (520) for fullness and for other conditions (fullness as an explicit example herein). If a collection is full or nearing full, then that collection can be evicted to an output queue (526). If no collection meets a fullness criteria, collections can still be evicted according to other heuristics (522). The output queue can monitor (528) a stall line from a downstream collector, and if the stall line is not active then the output queue can transmit (530) a packet. A specification as to what may be considered a full or near-full collection can be modified (534). Such modification can take into account backpressure (536) received from downstream collectors, and upstream information (538) from upstream collectors (as available).

Figure 11:
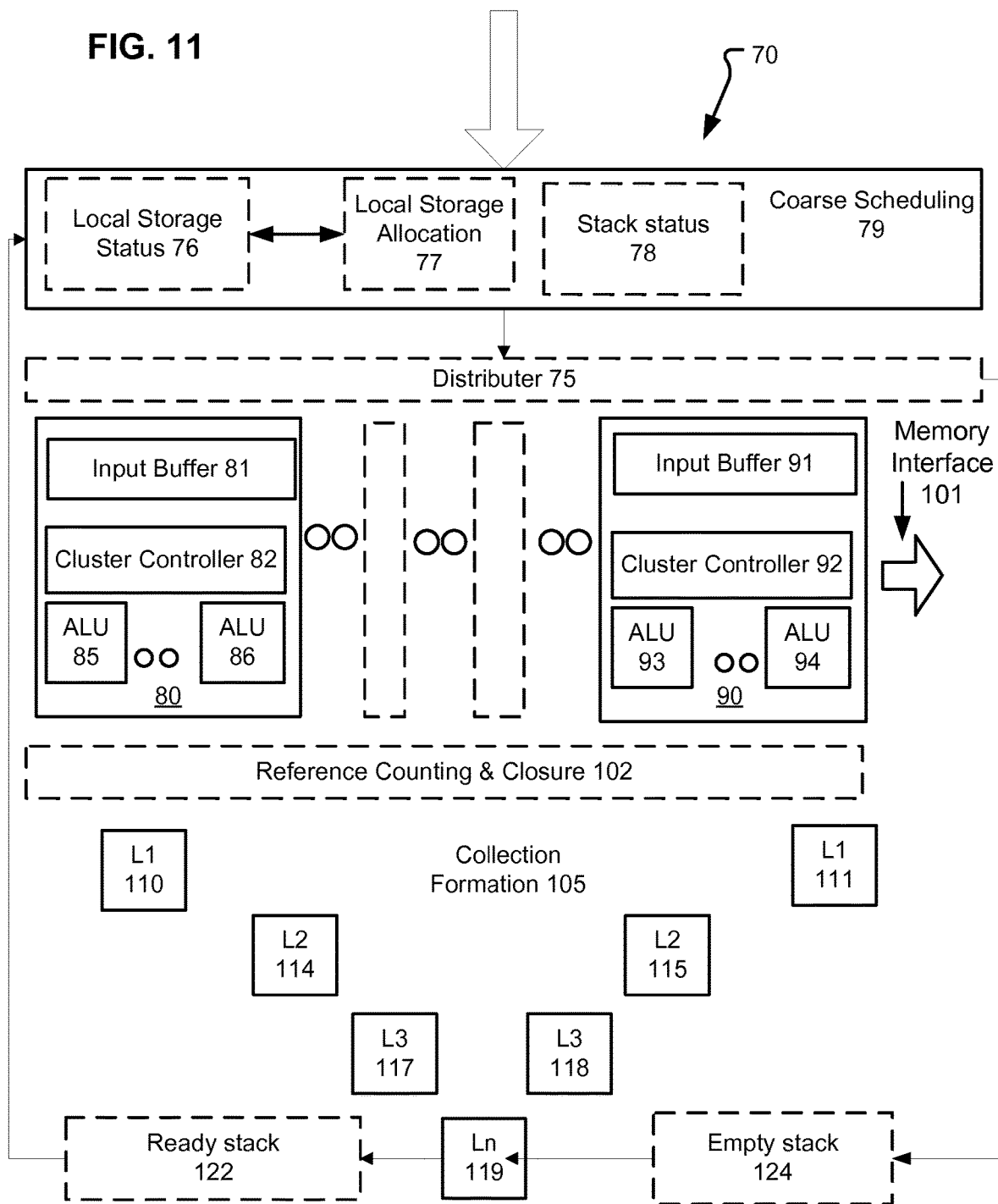
FIG. 11 depicts an example system architecture which can use multistage collection according to this disclosure.

FIG. 11 depicts a set of collectors in the context of an example computing architecture 70 in which such collectors may be used to reorganize outputs resulting from computations performed. Architecture 70 includes a plurality of clusters (cluster 80 and cluster 90 identified), each comprising a number of ALUs (e.g., ALU 85, 86 of cluster 80 and ALU 93-94 of ALU 90). Each cluster also comprises an input buffer 81-91, and a controller 82-92 (again, exemplary structures identified). The clusters each generally would have an interface (e.g., interface 101) to a main memory hierarchy, which can store data that can be used in calculations performed on the clusters. Each ALU additionally may have local cache memory resources available. In some situations, each ALU functions similarly to a Graphics Processor Unit ALU, in which threads are setup for execution, and use local memory as register files for the threads. Local memory can be partitioned in advance among a given group of threads that are executing on the cluster.

A distributor 75 feeds input buffers 81-91. In some implementations, distributor operates to provide a given data element to a particular cluster, based on presence of another data value stored in that particular cluster, which would be used in computation with that given data element. As described above, each cluster can output packets, each comprising an index element and one or more data elements. In a particular example applicable to ray tracing, the index element can be a reference to a shape and the data elements can be references to rays, where data defining each ray is contained in a local memory of a cluster (or of an ALU in a cluster, depending on chip organization). In some implementations, the reference to the shape can be mapped to a particular location in a main memory storing definitional information for the shape. In some implementations, the range of memory referenced also can identify a type of shape (e.g., primitive versus bounding volume, or bounding element) to be tested. Thus, in such an implementation, the program that will be executed in a cluster responsive to the combination of the ray and the shape can be inferentially selected based on a value of the index element.

In an example, each cluster outputs computation results to a reference counter and closure function 102. Such closure function 102 can in some situations be implemented as code running on the clusters themselves, and in other situations, portions of such function can be implemented in hardware. One such function that may be hardware implemented is tracking a number of references made to a given data element within memories of the cluster. For example, each time an index element and data element pairing are outputted from a cluster, reference counting and closure 102 can operate to adjust a count. When no more references to such data element exist, a special closure routine can be executed.

As described above, these packets of index elements and data elements can be grouped into increasingly larger collections through a multistage collector 105, which has exemplary constituent elements 110-119, which can each operate according to the exemplary disclosures above.

A final collector (119 here) can output packets to a ready stack 122, final collector 119 can receive information concerning packets that have been provided through distributor 75, thus freeing locations for reuse and identified in empty stack 124.

It was described above that collectors can have input widths (a number of data elements in a given chunk of output) sized at least in part based on a number of different computing units coupled to output data to that collector; for example, such sizing can be based on a number of different instruction streams that can be executed in those compute units, and a width of a SIMD vector in the compute units. Such sizing can be derated by a factor, if desired. For example, if a collector couples to two different compute units, and each can execute instructions on a 8-wide vector of data values, then the maximum theoretical output width of those compute units would be 16 data values. However, where the outputs contain index elements associated with the data elements, and the index elements are correlated to identifiers for code modules in an execution flow, then different original data values may diverge from each other. As such, these data values would have different associated index elements, and can be outputted in different packets. Therefore, a width of connection could be reduced based on an expectation of that situation; however, a completely full packet then would need to be transmitted over two transactions. As such, these kinds of implementation details can be left to selection by a person of ordinary skill, taken into account a particular kind of workload profile.

FIG. 12 introduces still other variations that can be employed in different implementations. FIG. 12 depicts that a first set 650 of compute clusters (each with C ALUs, and each ALU having a SIMD width of D, for example) and a second set 652 of compute clusters can have P ALUs, each with a SIMD width of Q, where at least one of P and Q is greater than C and D, respectively. A still further alternative can be that different clusters are clocked at different clock rates. Therefore, it would be expected that set 650 would have a different aggregate throughput than set 652. Taking into account this design detail, collectors 660, 662, and 664 can be sized differently than collectors 654, 656, and 658. Further collectors that coupled to receive outputs from these initial collectors also can be correspondingly sized.

FIG. 13 depicts another implementation variation, again using the example cluster arrangement of FIG. 12. In FIG. 13, a distinction is that collectors can be organized in a regular arrangement, analogous to a memory array, and in some implementations, each cluster can have the same number of collectors between it and an output queue. For example, collectors can be arranged as tiles of increasing area. However, in other implementations, some clusters can have fewer or greater collectors in such a path, such that a single larger tile may take the place of multiple smaller tiles. More specifically, collectors 666-670 are representative of a baseline size collector, and collectors 680 and 768 represent downstream collectors for that baseline size. Collectors 672, 674 and 676 represent examples of collectors of varying sizes. Collectors 682 and 684 represent that even though collectors can have different intermediate sizes, they each may still ultimately feed into a similarly sized collector, in some implementations. In some implementations, collectors of different sizes can feed different output queues. These output queues can return back to inputs of their respective clusters (as depicted for a single output queue example in FIG. 11).

A total size of each collector memory also can take into account a kind of data being outputted from a particular compute cluster. For example, one cluster can operate on single precision FP, and another on DP FP. A size of a given packet output also can depend on an amount of memory being addressed by the cluster. Flag bits and status bits also can be outputted in given implementations. As such, different implementations can have differently sized interconnection.

In summary of some aspects, collectors receive outputs from one or more compute units, where compute units themselves may comprise one or more clusters of ALUs. In some aspects, compute units may output multiple discrete outputs, and these outputs can be received by one or more collectors. In some implementations, the collectors can be arranged hierarchically, with a regular ratio between input and output queues.

The clock signal may provide a reference edge (or edges) on which stall signals are checked by each collector. Data movement between the collectors can be or start asynchronous to clock signals, such that a data movement transaction does not need to be triggered or complete according to a particular clock cycle. In some examples herein the term port was used to described a communication path between two functional components.

In some examples above the term queue was used to describe a structure used to receive inputs at a collector and to store output packets, in implementations according to these disclosures. In some cases, these input and output functions may be implemented using a FIFO buffer. However, in other implementations, other temporary storage approaches may be used, such as a ring buffer, a shared memory space, or a combination thereof. Such temporary storage can generally function as a FIFO, but can operate also or be implemented as non-FIFO operation if desired. In one approach, it is desired to have a small and simple memory that can buffer an element of data received for a short time, so that a collector element (e.g., implementations of the described packer) can read and process the data, allowing some amount of asynchronous operation, but not serving as storage for such data for a relatively significant period of time.

It was described above that outputs from processing units can produce outputs associated with index elements. In some workloads, the index elements can have a meaning within the dataset being used in the workload. In the example of a ray tracing workload, index elements can be, for example, rays being processed in the system can function as indexes. In some cases, identifiers for rays, e.g., references for rays, being processed in the system can function as indexes. Other example data that can provide a basis for indexing include indexes to particular programs, or portions of programs, and references to particular storage locations in memories. Multiple kinds of indexes can be operational at any given time. In an implementation, whether a given index is associated (or understood by the system) with any particular kind of data or program may be transparent to the packer. Rather, the programming of the system may simply set the index values, which can then be used by the packer. The further processing of groupings of data values collected with respect to any given index can be controlled based on the index by a scheduling entity.

Some aspects were described from the perspective of collecting outputs. However, this description is illustrative and not limiting in that data elements collected according to different implementations of these described aspects may vary. Also, even though certain collectable data elements may have been outputted, they may also ultimately be inputs, and therefore the terminology used is an aid to the person of ordinary skill in understanding how to apply the described aspects and not by way of structural limitation as to how or where in a system these described aspects may be deployed, or what kinds of data elements they collect, unless otherwise explicitly so limited by the appended claims.

It was described above that each component of a multistage collector (or packer) can include a memory element to store received data elements in associated with an index. These memory elements can be implemented by random access memory (RAM) technologies, such as static RAM (SRAM), and dynamic RAM (DRAM). If using DRAM, the DRAM can be implemented as an embedded DRAM, which may be available on a given process technology. Based on target characteristics of a given multistage collector, the characteristics of the individual memory elements can be determined. The implementation of these memory elements can be determined based on these characteristics, and characteristics of the kind of area allocated for the multistage collector within a chip containing the multistage collector, a target process for fabricating the chip, and other considerations such as these, which are design implementations selections based on the disclosures herein.

In sum, any of the functions, features, and other logic described herein can be implemented within or in conjunction with a variety of computing resources having characteristics according to examples and implementations disclosed herein. Such computing resources can be at different levels of abstraction, and can include a SIMD unit, a cluster of SIMD units, a core including one or more SIMD units or clusters thereof, such a core also can have some fixed function processing elements, the core can operate as an Symmetric MultiProcessor with other cores in a die, for example. Still other examples, include Graphics Processor Units (which can include components described herein), and interoperable groupings thereof. Other examples and implementations can be understood by those of skill in the art. Also, other functions, which are not primarily the focus of this description, can be provided or implemented as a process, thread or task that can be localized to one computing resource or distributed among a plurality of computing resources (e.g., a plurality of threads distributed among a plurality of physical compute resources).

The various examples described above are provided by way of illustration only and should not be construed as limiting. The disclosures herein can be adapted and understood from that perspective. In addition, separate boxes or illustrated separation of functional elements of illustrated systems implies no required physical separation of such functions, even though those of skill in the art may find advantages to physically separating some components, and combining others. The implementation decision as to what to implement in software and in hardware may change over time, as would also be an implementation decision based on the disclosures provided below. These implementation decisions are themselves exemplary, and a person of ordinary skill would be expected to make other such decisions in making an implementation of the disclosures presented herein.

What is claimed is:

1. A machine-implemented method of distributed multiprocessing, comprising:
   asynchronously receiving packets from a plurality of outputs of computation units, each of the packets comprising one or more constituent elements associated with a respective index element describing computation tasks to be performed for the one or more constituent elements; and in a plurality of steps, packaging the constituent elements comprised in the received packets into progressively larger packets, the packaging comprising, in each of the steps, grouping constituent elements into packets by comparing respective index elements in multiple received packets, and grouping those constituent elements associated with matching index fields.

2. The method of claim 1, wherein the packaging comprises buffering constituent elements of a packet received at a first time and combining the buffered constituent elements with constituent elements from a packet received at a second time having an index element matching the index element of the packet received at the first time.

3. The method of claim 1, wherein the plurality of steps are performed by collector units arranged in an interconnected series and each of the collector units is operable to identify collections to evict from its memory, responsive to a collection eviction process.

4. The method of claim 2, wherein the series of collector units is arranged in an inverted hierarchy, beginning with a layer of collector units receiving smaller packets and terminating with one or more collectors outputting one or more larger packets, each containing constituent data elements of a plurality of the smaller packets.

5. The method of claim 4, further comprising applying backpressure between collector units in different layers of the inverted hierarchy to regulate progress of packets through the plurality of collectors.

6. The method of claim 1, wherein one or more of the descriptions of a computation task to be performed comprises information identifying a shape, and the constituent elements comprise identifiers for rays to be tested for intersection with the shape.

7. The method of claim 1, further comprising selecting each description of a computation task from a plurality of pre-defined types of computation tasks comprising testing a ray for intersection with one or more shapes identified by the constituent elements.

8. The method of claim 1, wherein each description of computation to be performed comprises a reference to a memory location.

9. The method of claim 1, wherein each description of computation to be performed comprises a reference to a memory location, in a region of a memory reserved for storing a defined kind of shape data used during graphical rendering of a scene defined using the shape data.

10. The method of claim 9, wherein the defined kind of shape data is selected from acceleration shape data and primitive shape data.

11. A computing system, comprising:
a plurality of computation clusters, each for outputting discretized results of performing computation tasks, each discretized result comprising a collection index describing a respective computation task to be performed and a data element for use during performance of the computation task described by the collection index; and
a plurality of collectors, some of the collectors coupled to receive the discretized output outputted from respective computation clusters of the plurality, the collectors interoperating to gather the data elements from multiple discretized outputs into progressively larger collections, each collector comprising an index matcher that matches two or more collection indexes to identify common collection indexes, and a grouper configured to group data elements related to the same collection index for output as a group in conjunction with that collection index.

12. The computing system of claim 11, wherein collectors of the plurality are operable to activate a stall line that prohibits one or more collectors from outputting a collection of discretized outputs.

13. The computing system of claim 12, wherein collectors of the plurality are operable to compact information from the discretized outputs by collecting non-redundant information from multiple discretized outputs, and to output a compacted collection of information on an output that is conditioned based on monitoring the stall line.

14. The computing system of claim 11, wherein each computation cluster comprises a SIMD ALU, a port for reading to and writing from a memory subsystem, and an output port.

15. The computing system of claim 11, wherein each collector ingests discretized results of up to a first size and produces outputs fewer in number and larger than the first size.

16. The computing system of claim 11, wherein the plurality of collectors are arranged in an inverted hierarchy, comprising
a first layer of collectors, each collector coupled to a respective output port from a computation cluster of the plurality, and comprising a memory and a packing unit operable to receive discretized outputs from the coupled output port and to collect each discrete output into a collection according to an index associated with the discretized output; and
one or more subsequent layers of collector, each coupled to receive increasingly larger collections of the discrete outputs, wherein
each of the collectors is operable to identify collections to evict from its memory, responsive to a collection eviction process.

17. The system of claim 16, further comprising a distributor coupled to a final collector of the inverted hierarchy, and operable to distribute data elements from received groups of data elements among the plurality of computation clusters according to which of the computation clusters is to execute further computation involving each data element.

18. The computing system of claim 16, wherein the collection eviction process comprises each collector unit independently evicting collections in its memory that are full.

19. The computing system of claim 11, wherein each discrete output comprises a results vector, with a number of results up to a SIMD vector width of the computation cluster outputting that discrete output.

20. A non-transitory computer readable storage medium having stored thereon computer executable instructions that when executed cause at least one processor within a multi-processor system having a plurality of computation units to:
asynchronously receive packets from a plurality of outputs of computation units, each of the packets comprising one or more constituent elements associated with a respective index element describing computation tasks to be performed for the one or more constituent elements; and
in a plurality of steps, package the constituent elements comprised in the received packets into progressively larger packets, the packaging comprising, in each of the steps, grouping constituent elements into packets by comparing respective index elements in multiple received packets, and grouping those constituent elements associated with matching index fields.

* * * * *